United States Patent [19]

Atsuta et al.

[11] Patent Number: 5,739,621
[45] Date of Patent: Apr. 14, 1998

[54] VIBRATION TYPE MOTOR DEVICE

[75] Inventors: Akio Atsuta, Yokosuka; Nobuyuki Kojima, Kawasaki, both of Japan

[73] Assignee: Canon Kabushiki Kaisha, Tokyo, Japan

[21] Appl. No.: 574,080

[22] Filed: Dec. 18, 1995

[30] Foreign Application Priority Data

Dec. 22, 1994 [JP] Japan .................. 6-335309

[51] Int. Cl.$^6$ ............................ H01L 41/08
[52] U.S. Cl. ............................ 310/316; 318/116
[58] Field of Search ............... 310/323, 328, 310/316, 317, 319; 318/116

[56] References Cited

U.S. PATENT DOCUMENTS

| | | | |
|---|---|---|---|
| 4,727,276 | 2/1988 | Izukawa et al. | 310/316 |
| 5,023,526 | 6/1991 | Kuwabara et al. | 318/116 |
| 5,159,223 | 10/1992 | Suganuma | 310/316 |
| 5,173,631 | 12/1992 | Suganuma | 310/316 |
| 5,231,325 | 7/1993 | Tamai et al. | 310/323 |
| 5,410,204 | 4/1995 | Imabayashi et al. | 310/323 |

FOREIGN PATENT DOCUMENTS

| | | |
|---|---|---|
| 0584775 | 3/1994 | European Pat. Off. . |
| 0661764 | 7/1995 | European Pat. Off. . |
| 3289375 | 12/1991 | Japan . |
| 7193291 | 7/1995 | Japan . |

*Primary Examiner*—Mark O. Budd
*Attorney, Agent, or Firm*—Fitzpatrick, Cella, Harper & Scinto

[57] ABSTRACT

A vibration type motor device excites a vibration member by applying frequency signals to piezoelectric elements so as to obtain a driving force. A vibration state detection piezoelectric element is arranged on the vibration member, and when a vibration state is determined by detecting the phase difference between the output from the detection piezoelectric element and a driving frequency signal, a predetermined signal is superposed on the output from the detection piezoelectric element, thus allowing accurate detection of the vibration state even when the output from the piezoelectric element includes noise.

12 Claims, 11 Drawing Sheets

VIBRATION TYPE MOTOR DEVICE

BACKGROUND OF THE INVENTION

1. Field of the Invention

The present invention relates to a vibration type (vibration wave) motor which is used in, e.g., a lens driving device for a camera, and is driven by utilizing resonance of a vibration member.

2. Related Background Art

Recently, vibration wave motors called ultrasonic wave motors or piezoelectric motors have been developed and put into practical applications. The vibration wave motor is a new, non-electromagnetic driven type motor, which applies AC voltages to electro-mechanical energy conversion elements such as piezoelectric or electrostrictive elements to cause these elements to generate high-frequency vibrations, and picks up the vibration energy of these elements as a continuous mechanical motion. The motor is used in, e.g., a lens driving device for a camera due to its features such as low speed, large torque, and the like. The operation principle such as elliptic driving of a vibration member in the motor, and the like is well known since it has been described in many references such as Japanese Laid-Open Patent Application No. 3-289375 proposed by the present applicant, and a detailed description thereof will be omitted.

Figure 12:
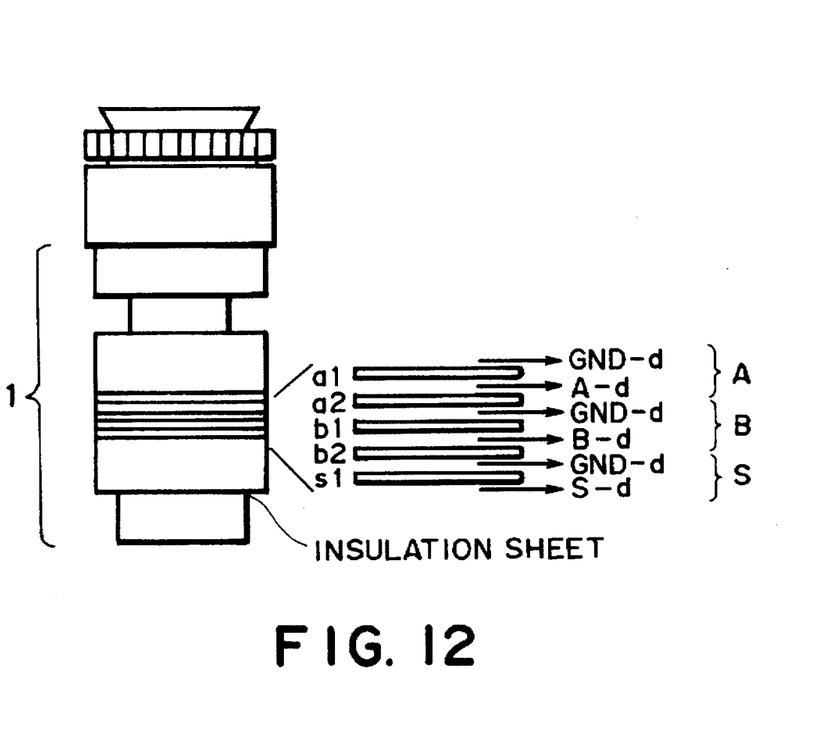
FIG. 12 is a side view of a conventional rod-shaped vibration wave motor.

FIG. 12 is a side view of a conventional rod-shaped vibration wave motor. A vibration member 1 constituting the rod-shaped vibration wave motor shown in FIG. 12 is constituted by a coupled body of piezoelectric or electrostrictive elements and elastic members.

A piezoelectric element portion of the vibration member 1 is constituted by A- and B-phase driving piezoelectric elements a1, a2, b1, and b2, and a vibration detection piezoelectric element s1. An A-phase application voltage is applied to a metal plate A-d sandwiched between the A-phase piezoelectric elements a1 and a2, and a B-phase application voltage is applied to a metal plate B-d sandwiched between the B-phase piezoelectric elements b1 and b2, thereby driving the piezoelectric element portion. The two outer sides of the A- and B-phase piezoelectric elements a1, a2, b1, and b2 are connected to the GND potential, and one side (B-phase side) of the vibration detection piezoelectric element s1 is similarly connected to the GND potential, so as to pick up a signal from a pickup electrode S-d on the side opposite to the GND potential. In this case, the signal pickup surface side of the vibration detection piezoelectric element s1 contacts a metal block. However, since the metal block is insulated from the GND potential by an insulation sheet, an output voltage corresponding to a vibration generated by the piezoelectric element portion can be directly obtained from the vibration detection piezoelectric element s1. Therefore, the resonance frequency can be calculated based on the magnitude of the output voltage, the phase difference between the driving voltages, and the like, thus allowing control of the motor.

Figure 13:
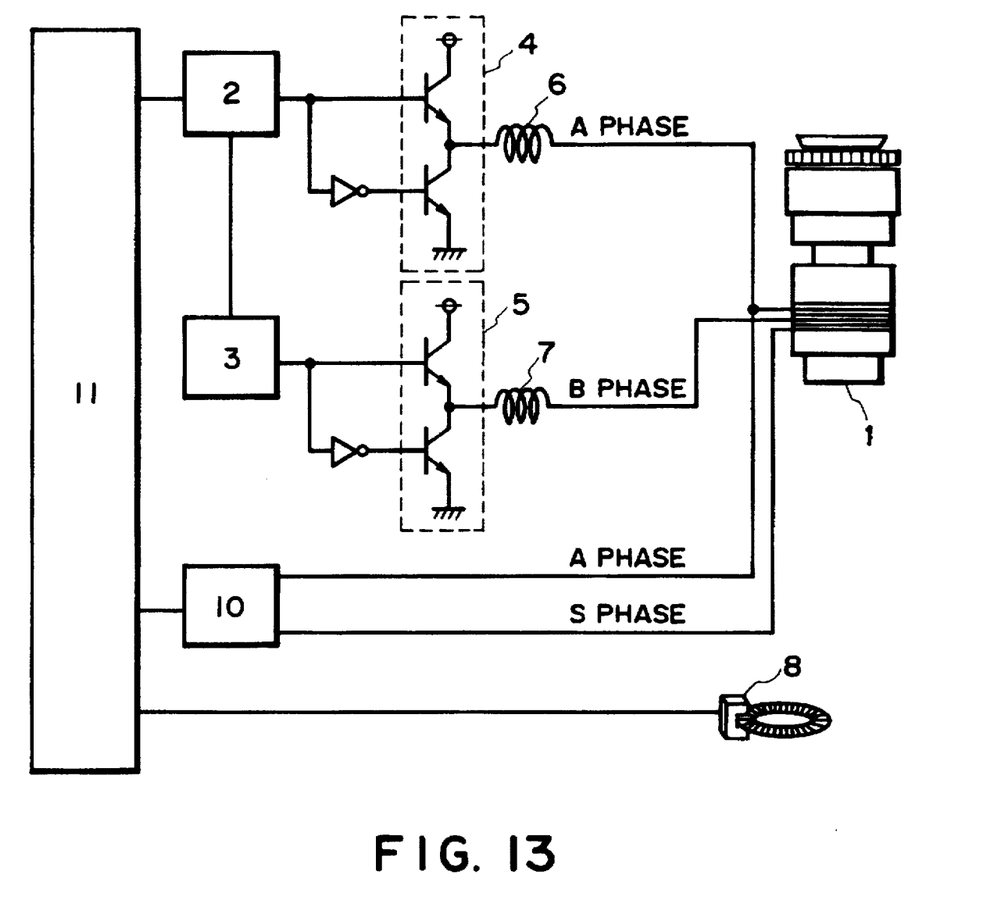
FIG. 13 is a block diagram of a driving circuit for the rod-shaped vibration wave motor shown in FIG. 12.

FIG. 13 is a block diagram of a driving circuit of the rod-shaped vibration wave motor shown in FIG. 12. The driving circuit shown in FIG. 13 is operated under the control of a microcomputer 11. The phase of an AC voltage generated by an oscillator 2 is shifted through 90° by a phase shifter 3. The AC voltage from the oscillator 2 is applied to a switching circuit 4, and the AC voltage from the phase shifter 3 is applied to a switching circuit 5, thereby switching the power supply voltage using the AC voltages. The outputs from the two switching circuits 4 and 5 are applied to driving electrodes A-d and B-d of the motor via matching coils 6 and 7 which attain impedance matching with the motor.

The rotational speed of the motor is detected by a speed detector (e.g., an encoder) 8, and a signal phase difference $\theta$A-S between the driving electrode A-d and the vibration detection electrode S-d is detected by a phase difference detector 10, thus performing frequency control based on the resonance frequency.

Figure 14:
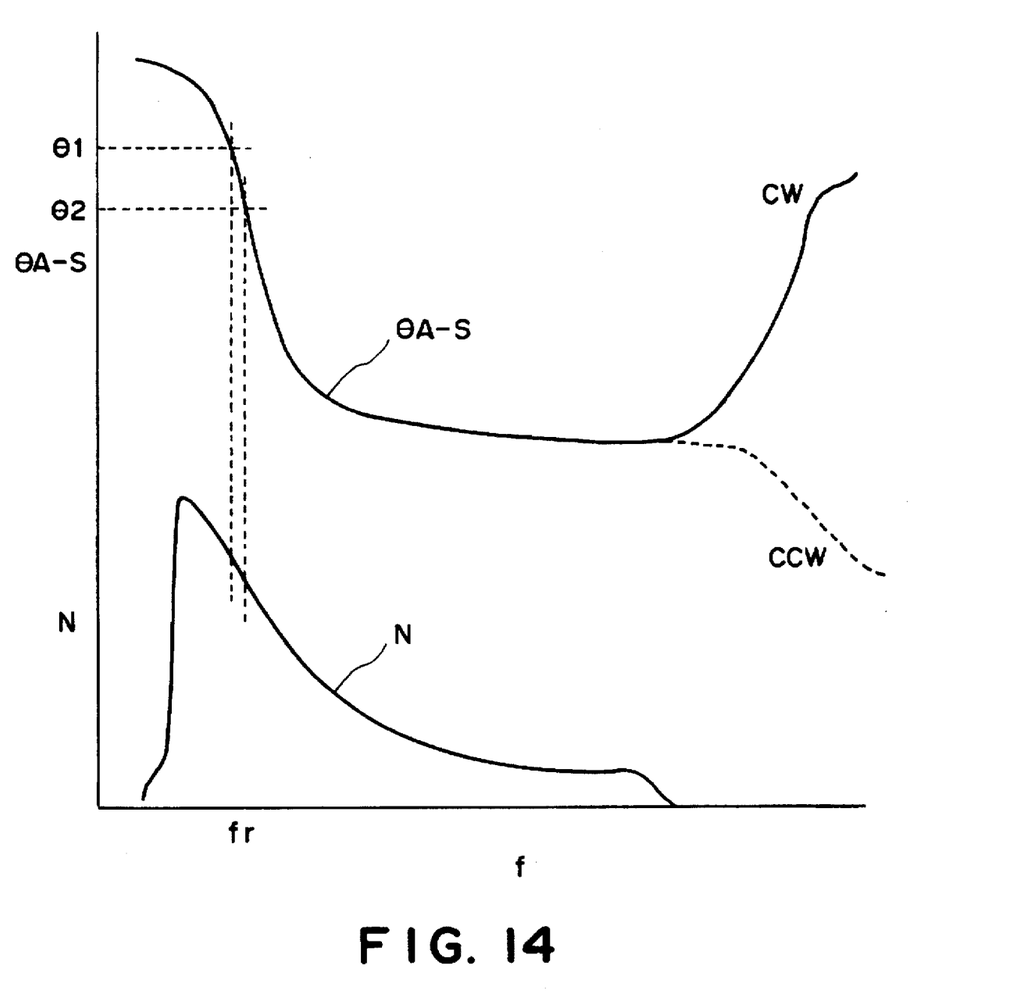
FIG. 14 is a graph showing the relationship among the frequency and the phase difference θA-S in the driving circuit shown in FIG. 13, and the motor rotational speed N.

FIG. 14 is a graph showing the relationship among the signal phase difference and frequency of the driving circuit for the vibration wave motor shown in FIG. 13, and the motor rotational speed.

In this case, the A-phase driving piezoelectric elements a1 and a2 and the vibration detection piezoelectric element s1 have a 180° positional phase difference therebetween. At a resonance frequency fr, the phase difference $\theta$A-S becomes $-90°$ (between $\theta$1 and $\theta$2) in both the CW (clockwise) and CCW (counterclockwise) directions. As the frequency becomes higher than the resonance frequency fr, the phase difference deviates from $-90°$, and at frequencies higher than a frequency f at which the motor (vibration member) 1 stops, the phase difference cannot have a stable value due to the influence of, e.g., noise since the output signal from the vibration detection piezoelectric element s1 becomes small.

In view of this problem, when the frequency is swept from the high-frequency side toward the low-frequency side upon starting the motor, the control microcomputer 11 checks based on the signal from the speed detector 8 if the motor 1 is operating. If the motor 1 is not operating, the microcomputer 11 lowers the frequency without detecting the phase difference $\theta$A-S. Thereafter, when the motor 1 begins to operate, the microcomputer 11 controls the driving frequency so that the phase difference $\theta$A-S is in the vicinity of the resonance frequency fr (between the phase differences $\theta$1 and $\theta$2), thereby driving the vibration wave motor 1.

SUMMARY OF THE INVENTION

One aspect of the application is to provide a vibration type motor device which excites a vibration member by applying frequency signals to an electro-mechanical energy conversion element portion arranged in the vibration member so as to obtain a driving force, wherein a superposition circuit for superposing a predetermined signal on an output from a vibration state detection element portion that detects the vibration state of the vibration member and generates an output corresponding to the detected vibration state is arranged, the predetermined signal is superposed on the detection output, and the driving state of the motor device is detected by a driving state detection circuit on the basis of the superposed output from the detection element portion and the frequency signals applied to the energy conversion element portion, thereby eliminating the influence of noise.

One aspect of the application is to provide, under the above object, a device in which a vibration detection energy conversion element portion and a driving energy conversion element portion are electrically coupled to each other, and the detection energy conversion element portion is used in the superposition circuit.

Other objects of the present invention will become apparent from the following description of the embodiments taken in conjunction with the accompanying drawings.

DESCRIPTION OF THE PREFERRED EMBODIMENTS

The preferred embodiments of the present invention will be described hereinafter with reference to the accompanying drawings.

Figure 1:
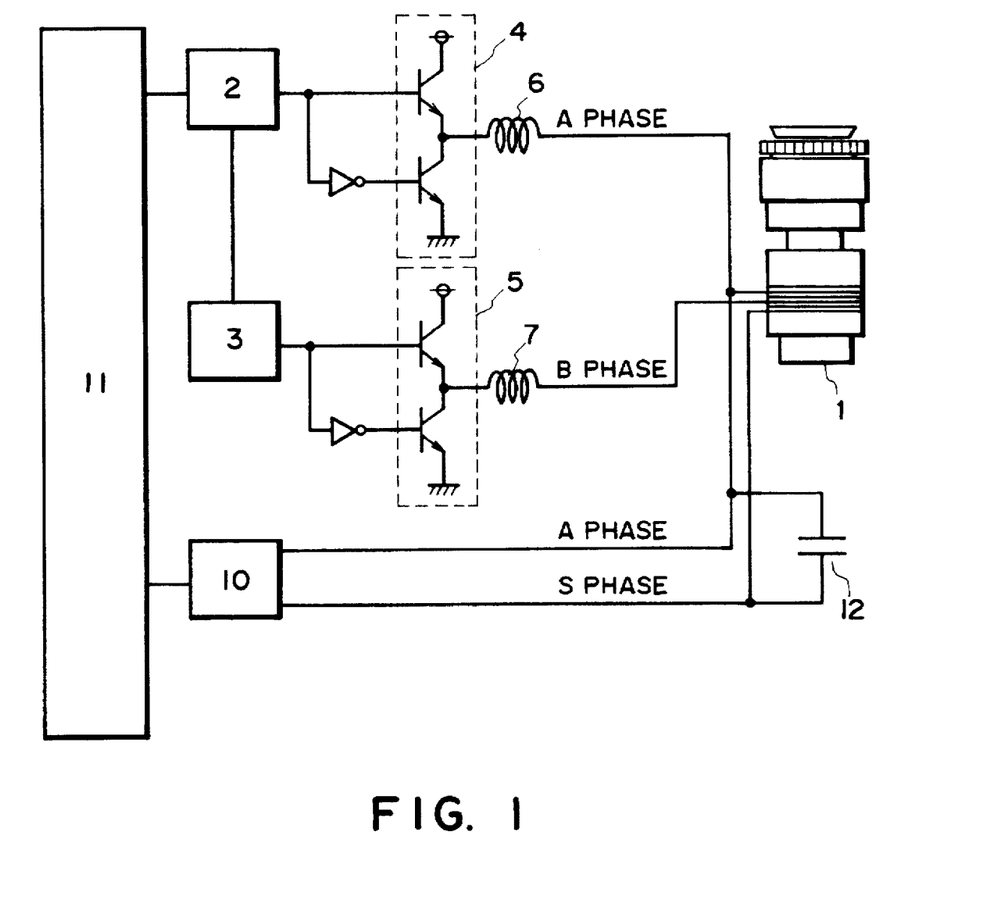
FIG. 1 is a block diagram of a driving circuit for a vibration wave motor according to the first embodiment of the present invention.

FIGS. 1 to 4 show the first embodiment of a driving circuit of a vibration type (vibration wave) motor according to the present invention. FIG. 1 is a block diagram of a driving circuit for a vibration wave motor according to the first embodiment of the present invention.

In the embodiment shown in FIG. 1, the speed detector 8 used in the prior art shown in FIG. 13 is omitted, and a capacitor 12 as an impedance element is arranged so that the A phase (A-phase driving side) is connected in series with the S phase (vibration detection side). In this case, A-phase driving piezoelectric elements as A-phase driving electro-mechanical energy conversion elements, and a vibration detection piezoelectric element (electro-mechanical energy conversion element) are positionally in-phase with each other, and a phase difference θA-S of +90° is obtained at the resonance frequency. Note that the same reference numerals in FIG. 1 denote the same parts as in the prior art shown in FIG. 13, and a detailed description thereof will be omitted.

Figure 2:
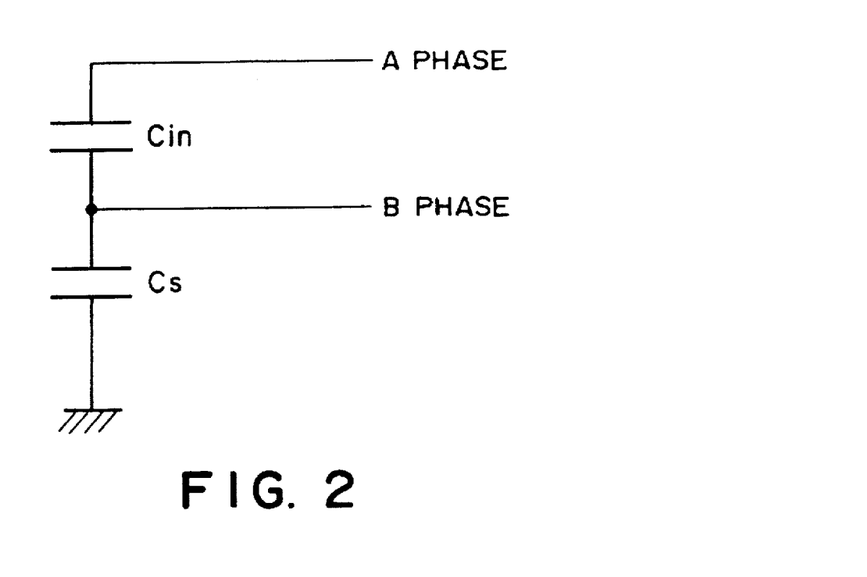
FIG. 2 is a schematic diagram of a principal part of the driving circuit for the vibration wave motor shown in FIG. 1.

FIG. 2 is a schematic diagram showing a principal part of the driving circuit for the vibration wave motor shown in FIG. 1. FIG. 2 illustrates an equivalent simplified principal part of the driving circuit for the vibration wave motor shown in FIG. 1, and the driving circuit can be expressed by a capacitive component Cs on the vibration detection piezo-electric element side and a capacitive component Cin formed by the capacitor 12 connected in series with the S phase.

Figure 3:
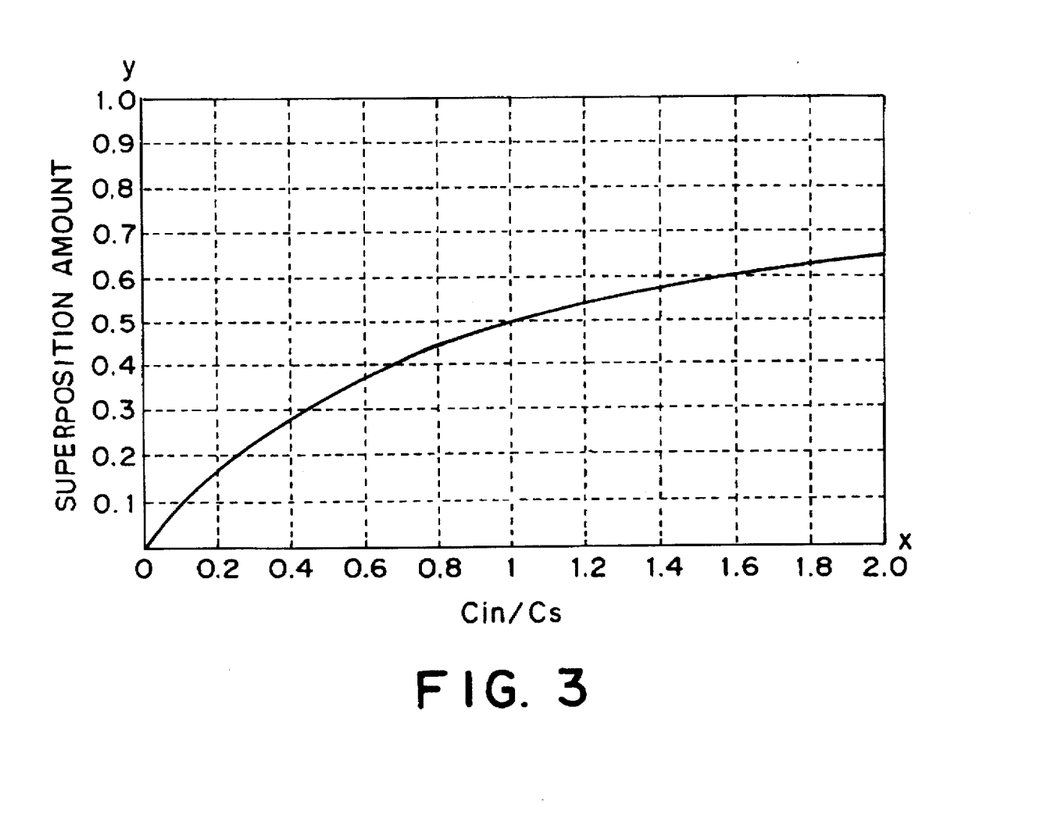
FIG. 3 is a graph showing the relationship between Cin/Cs and the ratio of the superposition signal in the driving circuit of the vibration wave motor shown in FIG. 1.

FIG. 3 is a graph showing the relationship between Cin/Cs shown in FIG. 2 and the superposition ratio of a signal to be superposed on the vibration detection portion.

The operation will be described below.

As can be seen from the graph in FIG. 3, if the signal to be superposed (A-phase voltage in this embodiment) is constant, a larger A-phase voltage component is superposed on the S phase as the ratio "Cin/Cs" between the two capacitive components is larger. More specifically, the magnitude of the signal to be superposed on the S phase can be adjusted by changing "Cin/Cs".

If the magnitude of the signal to be superposed on the S phase is too small, an error occurs when the S-phase signal has a small amplitude; if the magnitude is too large, a detection error of the resonance frequency occurs. Therefore, the magnitude of the signal to be superposed is preferably adjusted to fall within the range of "1/20 to 1/3" of the output voltage (maximum) from the vibration detection portion at the resonance frequency, i.e., within an optimal magnitude range on the experimental basis as well.

When the magnitude of an original A-phase signal to be superposed is set to be equal to that of the output voltage from the vibration detection portion at the resonance frequency, the magnitude of the signal to be superposed can be adjusted to fall within the optimal range of "1/20 to 1/3" of the output voltage from the voltage detection portion by adjusting the ratio "Cin/Cs" between the capacitive components (the ratio of the capacitive component Cs of the vibration detection portion and the capacitive component Cin arranged in series with Cs) to fall within the range of "0.05<Cin/Cs<0.5".

The above-mentioned relationship between the capacitive component ratio and the magnitude of the signal to be superposed can be utilized as a reference in the adjustment process or an index in design.

Figure 4:
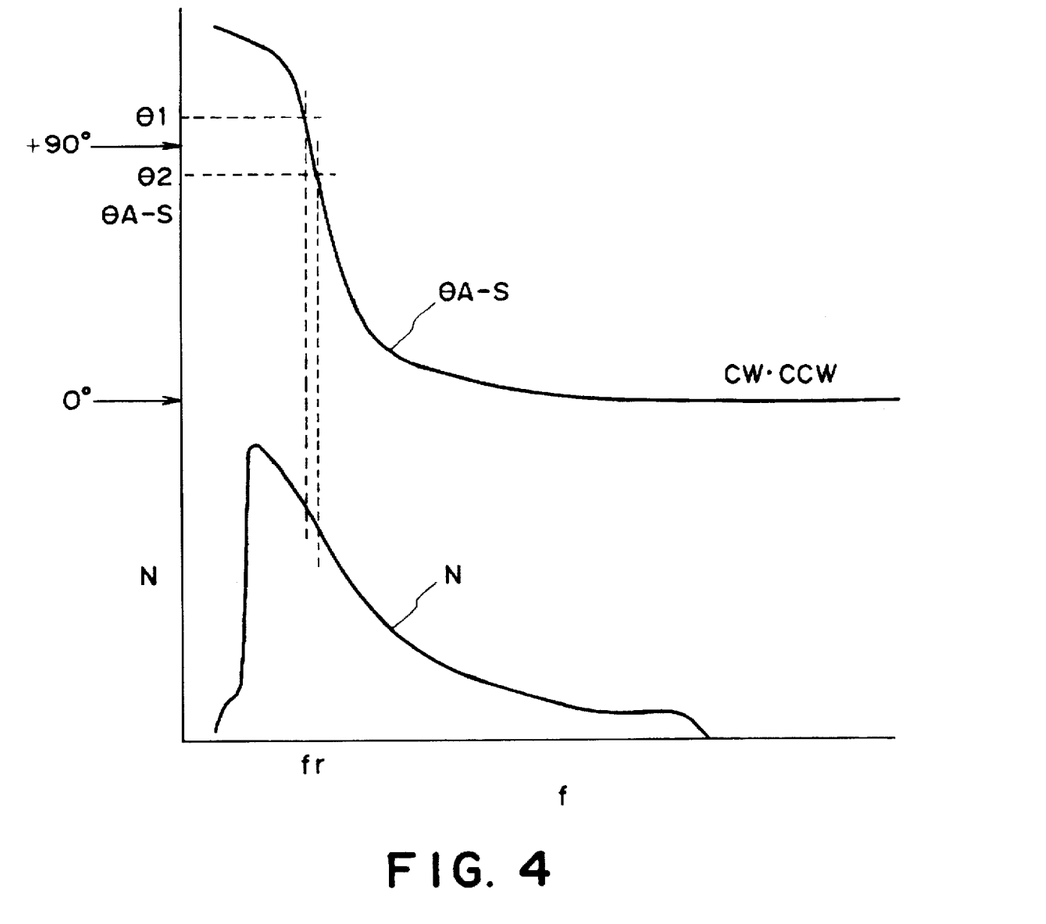
FIG. 4 is a graph showing the relationship among the frequency and the phase difference θA-S in the driving circuit for the vibration wave motor shown in FIG. 1, and the motor rotational speed N.

FIG. 4 is a graph showing the relationship among the driving frequency and phase difference of the driving circuit for the vibration wave motor shown in FIG. 1, and the motor rotational speed.

In the prior art shown in FIG. 14, the phase difference θA-S does not have a stable value at frequencies higher than the frequency f at which the motor begins to operate. However, in this embodiment, the phase difference θA-S is stable at 0° (in phase with the A phase) even at frequencies higher than the frequency f at which the motor begins to operate. Therefore, when the frequency is swept from the high-frequency side toward the low-frequency side upon starting the motor, since the phase difference is 0° even before the motor begins to operate, the frequency can be controlled to be continuously lowered, so that the motor is driven in a stable region corresponding to the rotational speed N near the resonance frequency fr.

As described above, in this embodiment, a speed detector 8 such as an encoder, which is required in the prior art, can be omitted, and the motor 1 can be efficiently driven at the resonance frequency fr on the basis of only the information of the phase difference θA-S, thus realizing size and cost reductions.

The second embodiment of the present invention will be described below.

Figure 5:
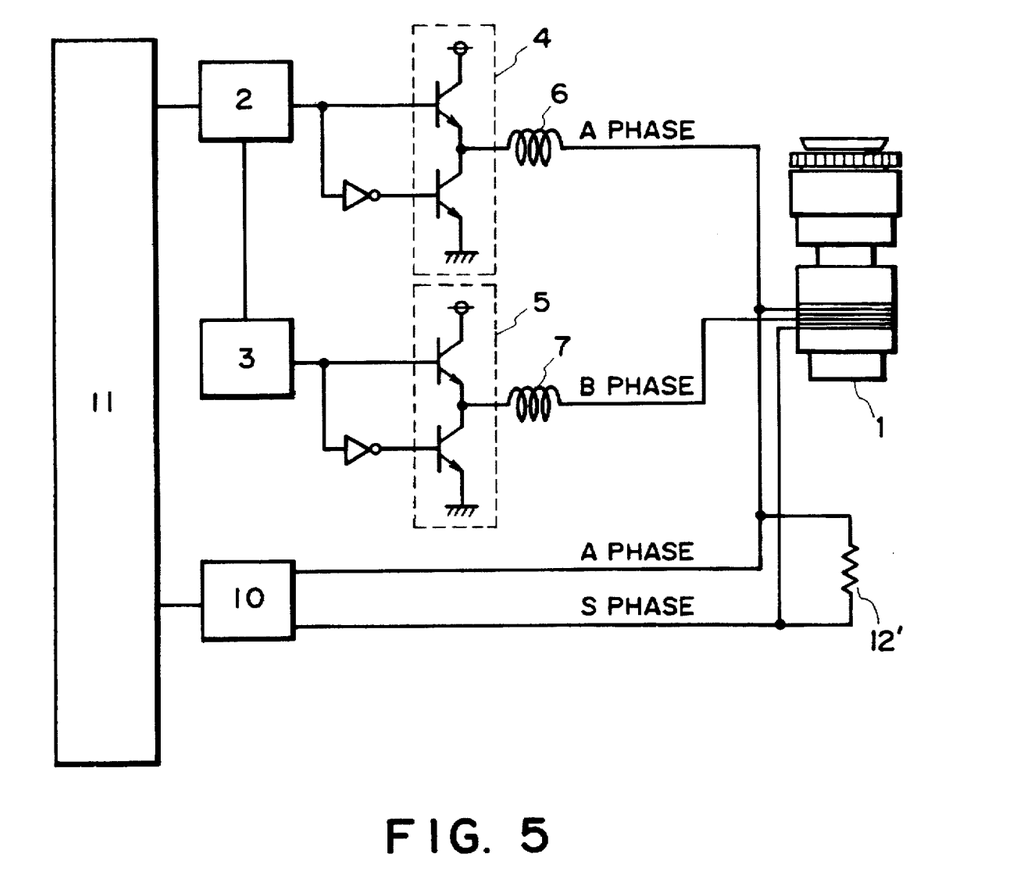
FIG. 5 is a block diagram of a driving circuit for a vibration wave motor according to the second embodiment of the present invention.

FIG. 5 is a block diagram of a driving circuit for a vibration wave motor according to the second embodiment of the present invention.

The embodiment shown in FIG. 5 has substantially the same arrangement as that in the first embodiment, except that a resistor 12' replaces the capacitor 12 serving as the impedance element. The same reference numerals in FIG. 5 denote the same parts as in the first embodiment, and a detailed description thereof will be omitted.

Figure 6:
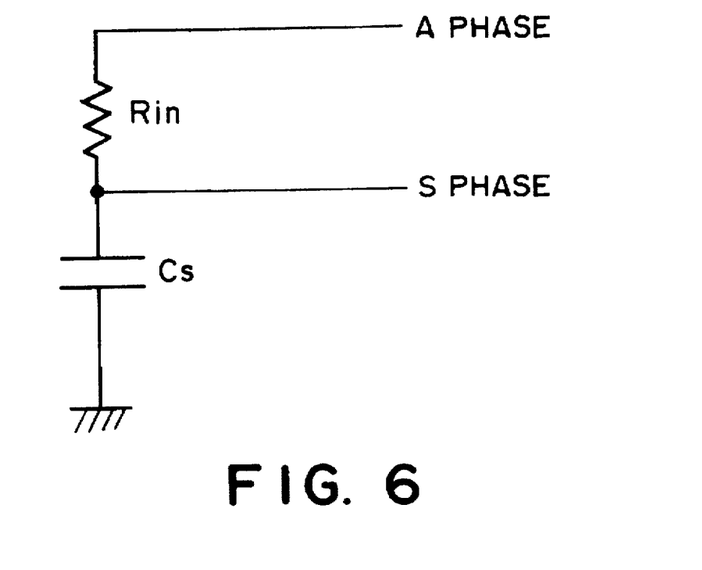
FIG. 6 is a schematic diagram showing a principal part of the second embodiment shown in FIG. 5.

FIG. 6 is a schematic diagram of the embodiment shown in FIG. 5.

FIG. 6 illustrates an equivalent simplified principal part of the driving circuit for the vibration wave motor shown in FIG. 5, and the driving circuit can be expressed by the capacitive component Cs on the vibration detection piezoelectric element side and a resistance Rin (12') connected in series with the S phase.

With this arrangement, the magnitude of a signal to be superposed on the S phase can be adjusted by changing the ratio "Rin/Cs" of Rin to Cs of the vibration detection portion as in the first embodiment. In addition, adjustment is easier than the first embodiment since "Rin/Cs" can be changed by varying the resistance.

As described above, according to the second embodiment, the magnitude of a signal to be superposed can be adjusted by a simple arrangement without causing any phase shift. In addition, since the degree of attenuation of the magnitude of a signal to be superposed on the S phase becomes larger than that attained by the capacitor 12 as the frequency becomes higher, an unnecessary high-frequency component included in an original signal to be superposed can be removed so as not to be superposed on the S phase.

The third embodiment of the present invention will be described below.

Figure 7:
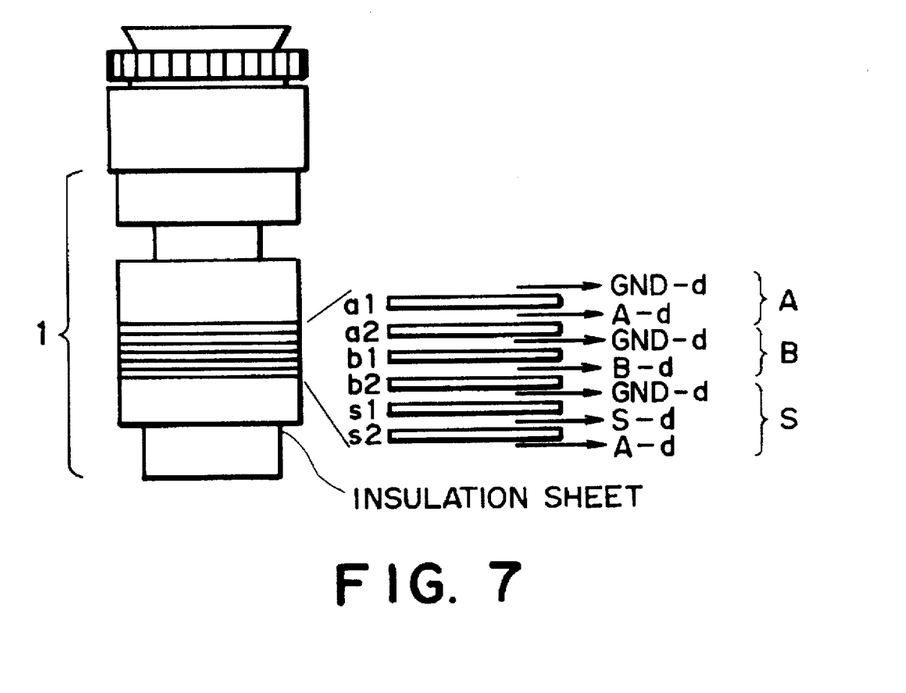
FIG. 7 is a side view of a vibration wave motor according to the third embodiment of the present invention.

FIG. 7 is a side view of a rod-shaped vibration wave motor according to the third embodiment of the present invention.

In the first embodiment, the capacitor 12 is arranged outside the motor. However, in the third embodiment shown in FIG. 7, another piezoelectric element s2 is added as a built-in capacitor to the S-phase portion in the motor in addition to the piezoelectric element s1, and the side, opposite to the S phase (S-d), of the element s2 is connected to the A phase (A-d).

Since a piezoelectric element inherently serves as a capacitive element unless an electric charge is applied thereto, the piezoelectric element for the vibration member 1 of the motor can be used.

With this arrangement, the A-phase voltage component can be superposed on the S-phase signal as in the first embodiment.

As described above, according to the third embodiment, the piezoelectric element in the vibration member 1 is used as a capacitive element, i.e., the capacitive element is assembled in the motor as a built-in capacitor. Therefore, a more compact arrangement can be realized, and the efficient control effect as in the first embodiment can be obtained.

The fourth embodiment of the present invention will be described below.

Figure 8:
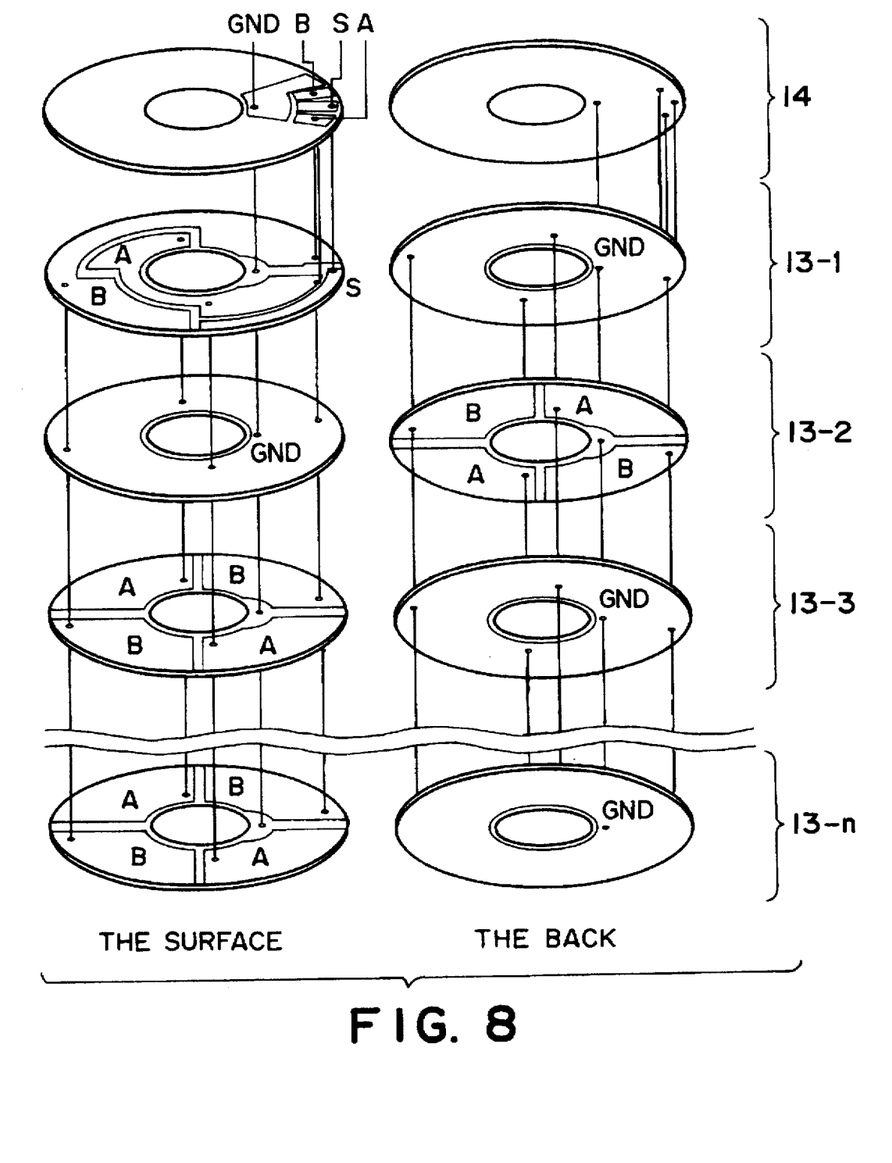
FIG. 8 is an exploded perspective view showing the arrangement of a piezoelectric element portion of a rod-shaped vibration wave motor according to the fourth embodiment of the present invention.

FIG. 8 is an exploded perspective view of a piezoelectric element portion as an electro-mechanical energy conversion element portion of a vibration wave motor according to the fourth embodiment of the present invention. The fourth embodiment shown in FIG. 8 is applied to a vibration wave motor, the piezoelectric element portion of which has a multi-layered structure to attain a size reduction and high reliability. Note that the multi-layered (stacked) structure is described in detail in Japanese Patent Application No. 5-331848.

In FIG. 8, piezoelectric elements 13-1 to 13-n constitute a driving & vibration detection element portion, and are stacked using through holes and the like. The piezoelectric element 13-1 is divided into three regions, i.e., driving electrodes A and B, and a vibration detection electrode S. On the entire back of the element 13-1, i.e., on the entire surface of the element 13-2, an electrode is formed except for through hole portions.

On one surface of each of the elements 13-2 to 13-n, a cross-shaped pattern is formed to divide the surface into four regions. The opposing ones of these four regions are respectively used for driving the A and B phases. On the other surface of each of these elements, an electrode is entirely formed except for through holes, as in the element 13-1.

The element 13-3 has the same electrode pattern as that of the element 13-2, and through holes are formed on these elements at symmetrical positions. (Note that the same effect as described above can be obtained when one of the elements 13-2 and 13-3 has the above-mentioned element pattern and the other element has no electrode pattern.)

The element 13-4 and the subsequent elements are stacked to repeat the combinations of the elements 13-2 and 13-3, thus forming an n-layered element structure. Note that only the element 13-n has one through hole.

In this case, the reason why each piezoelectric element is divided into four regions is to effectively use the driving force of the motor. A detailed description thereof will be omitted. Opposing electrodes are polarized in opposite directions. These piezoelectric elements can similarly drive the vibration wave motor by applying AC voltages having different phases to the electrodes A and B of the piezoelectric element 13-1.

An uppermost piezoelectric element 14 is arranged to concentrate the feed positions on one portion on the perimeter of the motor (patterns A, B, and S).

Figure 9:
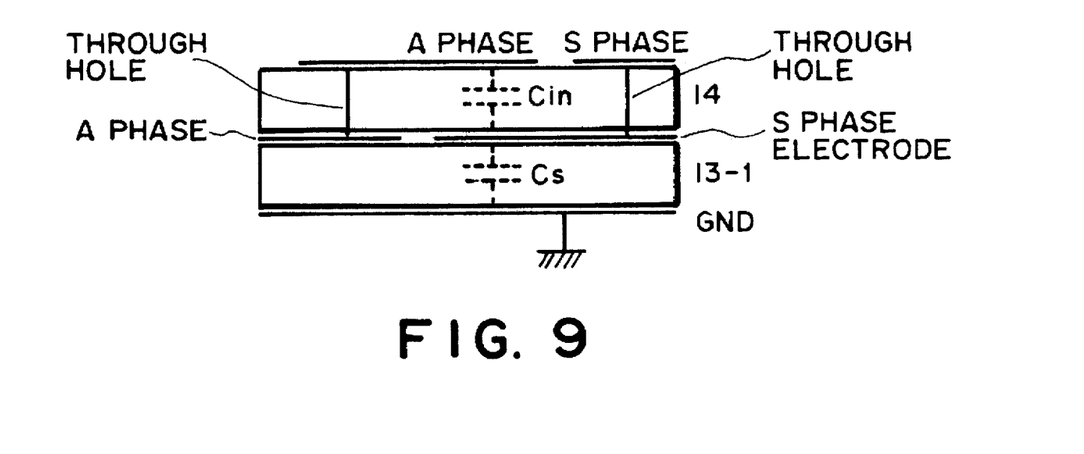
FIG. 9 is a schematic view showing a principal part of the fourth embodiment shown in FIG. 8.

FIG. 9 is a schematic view showing a principal part of the multi-layered piezoelectric element portion shown in FIG. 8.

FIG. 9 illustrates an equivalent simplified structure near the vibration detection portion of the piezoelectric elements 14 and 13-1 in FIG. 8. As can be seen from FIG. 9, the A-phase feed portion of the piezoelectric element 14 is stacked on the S-phase portion of the element 13-1 and the like. Therefore, the A- and S-phase patterns on the piezoelectric elements 14 and 13-1 are connected to each other to sandwich the capacitive component of the piezoelectric element 14 therebetween so as to form a coupling capacitance Cin, and the A-phase voltage component is superposed on the S phase via Cin.

As described above, according to the fourth embodiment, since the multi-layered structure is adopted, the piezoelectric elements 14 and 13-1 to 13-n are integrally sintered and formed as one member, and piezoelectric elements need not be stacked via electrode plates (A-d, S-d, and the like). In addition, "Cin/Cs" changes in accordance with the coupling capacitance which depends on the stacking degree of, e.g., pattern intervals, shapes, and the like of the A and S phases, and the magnitude of a signal to be superposed can be adjusted, thus obtaining the effect of the present invention and realizing a compact, high-efficiency vibration wave motor.

In each of the above-mentioned embodiments, a rod-shaped vibration wave motor has been exemplified. However, the present invention can be applied to motors of other types in addition to the rod-shaped motor as long as they use a vibration detection piezoelectric element.

The fifth embodiment of the present invention will be described below.

Figure 10:
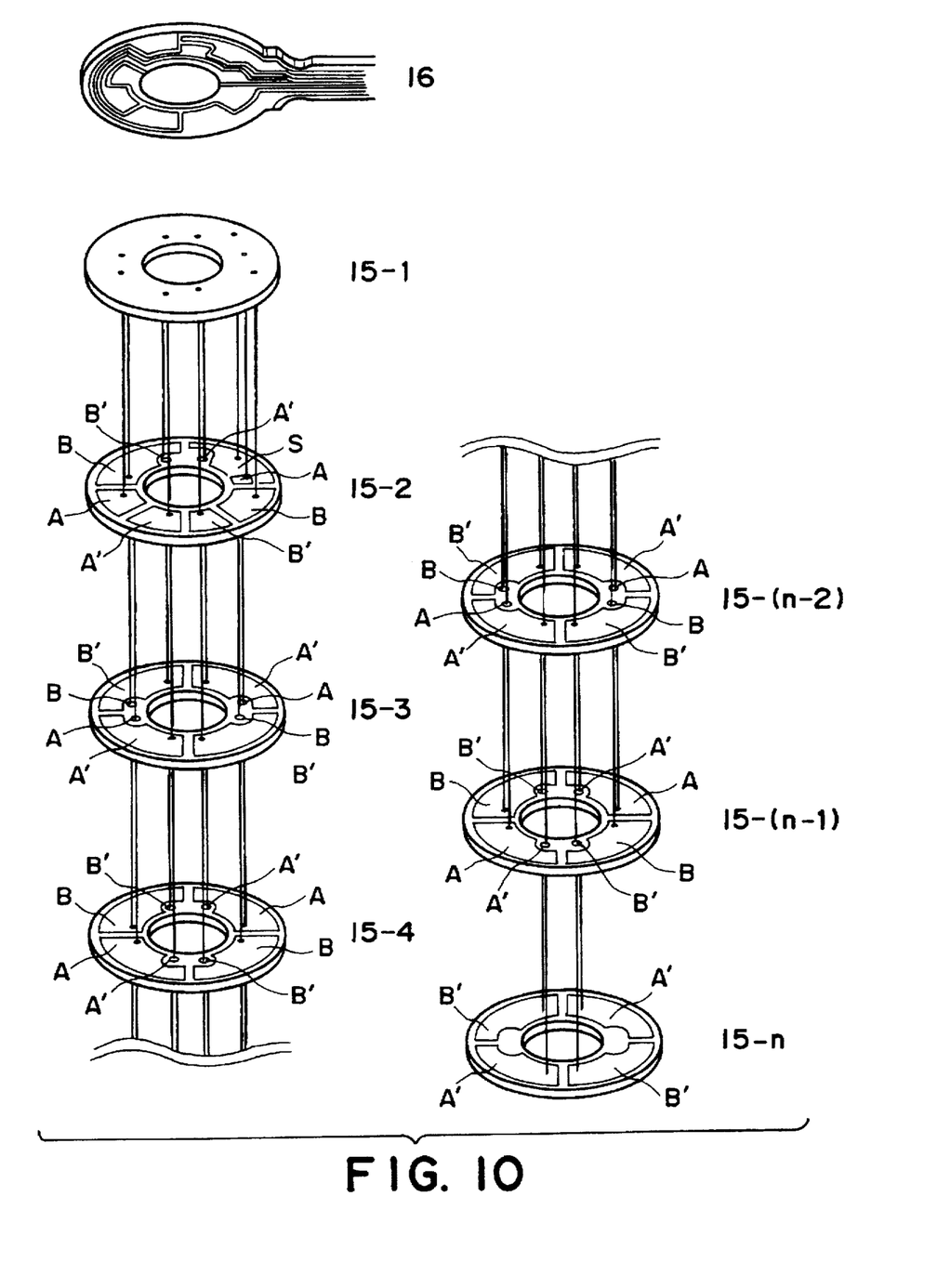
FIG. 10 is an exploded perspective view showing the arrangement of a piezoelectric element portion of a rod-shaped vibration wave motor according to the fifth embodiment of the present invention.

FIG. 10 is an exploded perspective view showing the structure of a piezoelectric element portion of a vibration wave motor according to the fifth embodiment of the present invention. The fifth embodiment shown in FIG. 10 adopts a multi-layered structure of piezoelectric elements 15-2 to 15-n as in the fourth embodiment. However, the patterns of the fifth embodiment are different from those in the fourth embodiment, and electrodes A' and B' are arranged in addition to the driving electrodes A and B.

When voltages having opposite phases are applied to these electrodes A, A', B, and B', an energy saving effect is obtained, i.e., the motor can be driven at a driving voltage half that required for the motor having only the electrodes A and B. The electrodes are formed on one surface of each of the piezoelectric elements 15-2 to 15-n, and the electrode pattern on the opposing surface is transferred onto each surface without any electrodes.

An uppermost piezoelectric element 15-1 has no electrodes but has only through holes. Since a pattern is formed on a flexible board 16 to supply electric power to through hole portions on the element 15-1, the pattern on the flexible board 16 is equivalent to the electrode pattern on the uppermost piezoelectric element 15-1.

Therefore, the coupling capacitance Cin changes depending on the stacking degree of the A-phase power supply portion of the flexible board 16 on the S-phase portion of the piezoelectric element 15-2, i.e., the ratio "Cin/Cs" changes, thus adjusting the magnitude of the A-phase component to be superposed on the S phase.

As described above, according to the fifth embodiment, since electric power is supplied from the upper portion of the multi-layered piezoelectric element portion using the flexible board 16, the piezoelectric elements 15-1 to 15-n (e.g., their patterns) need not be changed to adjust the magnitude of a signal to be superposed. The magnitude of the A-phase component to be superposed can be adjusted by changing the stacking degree of the A-phase supply portion on the S-phase portion of the piezoelectric element 15-2 on the flexible board 16 side.

The sixth embodiment of the present invention will be described below.

Figure 11:
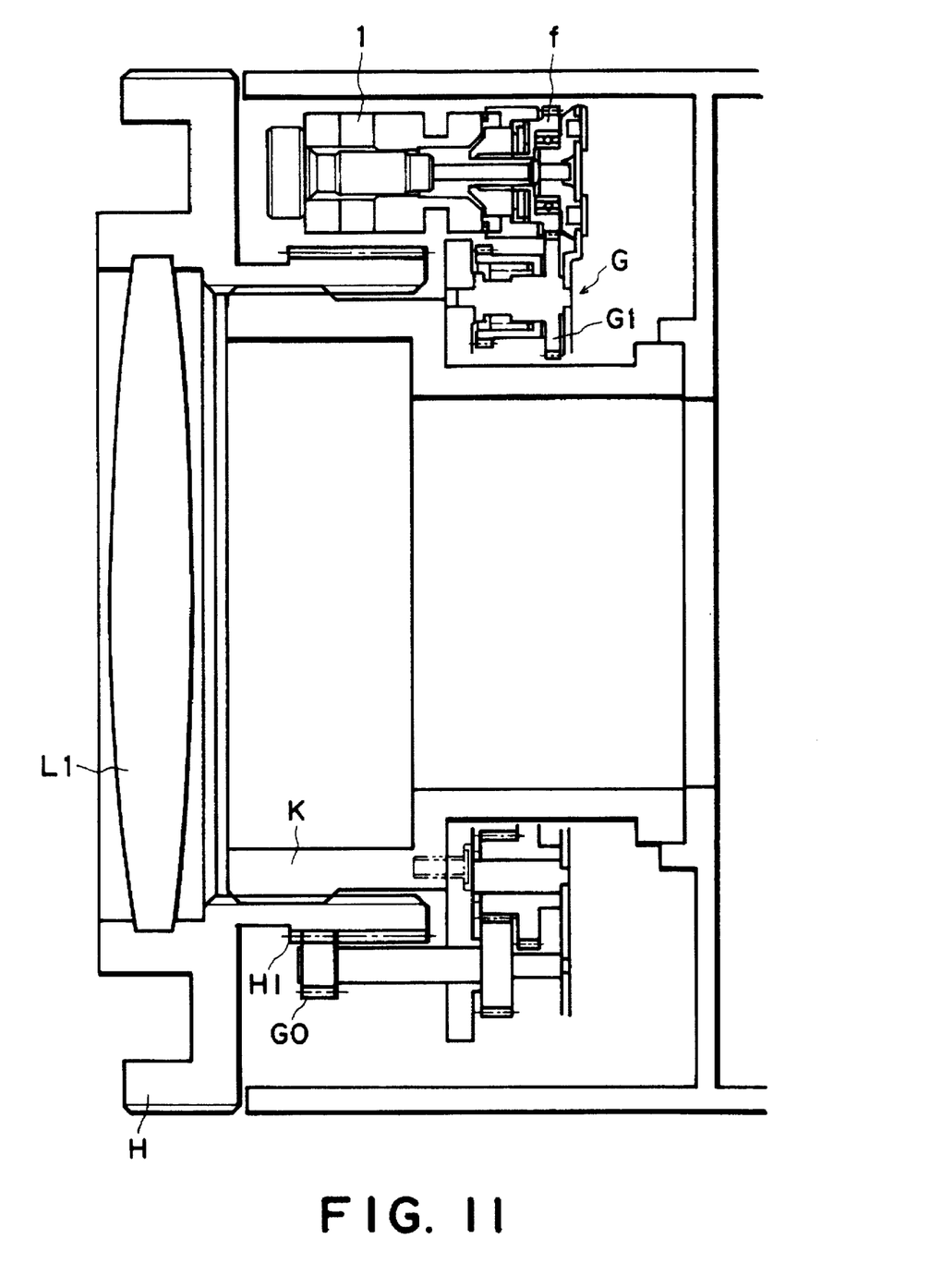
FIG. 11 is a sectional view showing the arrangement of a lens driving device according to the sixth embodiment of the present invention.

FIG. 11 is a sectional view showing the arrangement of a lens driving device using a vibration wave motor which is driven by a driving circuit of the present invention.

In the driving device of the sixth embodiment shown in FIG. 11, a rod-shaped vibration wave motor having a vibration member 1 is driven by a driving circuit of the present invention, and does not require any external members to be attached to the piezoelectric element portion such as the speed detector 8 used in the prior art.

A gear F is integrally assembled with the vibration wave motor, and meshes with an input gear GI of a gear transmission mechanism G. An output gear GO of the mechanism G meshes with a gear HI formed on a lens holding member H for holding a lens L1. The lens holding member H is helicoid-coupled to a stationary barrel K, and is rotated by the driving force of the vibration wave motor via the gear transmission mechanism G, thus attaining a focusing operation.

As described above, according to the sixth embodiment, since the lens driving device for a camera is constituted using the vibration wave motor driven by the driving circuit of the present invention, a high-performance lens driving device, which can attain a further size reduction and can cope with, e.g., a high-speed AF driving operation, can be realized.

As the microcomputer 11 shown in FIGS. 1 and 5, a microcomputer, which is programmed to inhibit or regulate frequency shifts in the low-frequency direction when the phase difference detected by a phase difference detector 10 becomes one representing the resonance frequency or a slightly high frequency near the resonance frequency, or is programmed to control the frequency to obtain a predetermined phase difference, is used.

As the signal to be superposed on the S phase, the A-phase signal is exemplified. However, the present invention is not limited to this. For example a frequency signal which has a predetermined level and a phase close to the phase of a driving frequency signal, or the like may be superposed.

What is claimed is:

1. A vibration type motor device, which excites a vibration member by applying a frequency signal to an electro-mechanical energy conversion element portion arranged in the vibration member, so as to obtain a driving force, comprising:

a vibration state detection element portion that detects a vibration state of the vibration member and generates an output corresponding to the detected vibration state;

a superposition circuit that superposes an output from said vibration state detection element portion on said frequency signal via an impedance element; and a driving state detection circuit that detects a driving state of said motor device on the basis of the output, superposed on the frequency signal, from said vibration state detection element portion, and the frequency signal applied to the electro-mechanical energy conversion element portion.

2. A device according to claim 1, wherein said impedance element is a capacitance element, and the frequency signal is superposed on said vibration state detection element portion via the capacitance element.

3. A device according to claim 1, wherein a magnitude of the frequency signal has a value falling within a range of 1/20 to 1/3 of an output voltage from said vibration state detection element portion at a resonance frequency.

4. A device according to claim 2, wherein a ratio of a capacitive component of said vibration state detection element portion and a capacitive component of said capacitance element is set to fall within a range from 0.05 to 0.5.

5. A device according to claim 1, wherein said impedance element is a resistance element, and the frequency signal is superposed on said vibration state detection element portion via the impedance element.

6. A vibration type motor device, which excites a vibration member by applying a frequency signal to an electro-mechanical energy conversion element portion arranged in the vibration member, so as to obtain a driving force, comprising:

a vibration state detection electro-mechanical energy conversion element portion that detects a vibration state of the vibration member and generates an output corresponding to the detected vibration state, said vibration state detection electro-mechanical energy conversion element portion being electrically coupled to the electro-mechanical energy conversion element portion to which the frequency signal is applied by way of an impedance element, wherein the frequency signal is superposed on the output corresponding to the detected vibration state; and a driving state detection circuit that detects a driving state of said motor device on the basis of the superposed output and the frequency signal applied to the electro-mechanical energy conversion element portion.

7. A device according to claim 6, wherein the electro-mechanical energy conversion element portion is constituted by piezoelectric elements, and the piezoelectric elements of the electro-mechanical energy conversion element portion to which the frequency signal is applied are stacked on the piezoelectric elements of said vibration state detection electro-mechanical energy conversion element portion.

8. A motor for a vibration type motor device, which excites a vibration member by apply a frequency signal to an electro-mechanical energy conversion element portion arranged in the vibration member, so as to obtain a driving force, and performs driving control in accordance with a vibration state, comprising:

a vibration state detection element portion that detects a vibration state of the vibration member and generates an output corresponding to the detected vibration state; and a superposition circuit that superposes an output from said vibration state detection element portion on said frequency signal via an impedance element, said superposition circuit outputting a superposed output as a signal used for detecting the vibration state.

9. A motor according to claim 8, wherein said impedance element is a capacitance element.

10. A motor according to claim 8, wherein a magnitude of the frequency signal has a value falling within a range of $\frac{1}{20}$ to $\frac{1}{3}$ of an output voltage from said vibration state detection element portion at a resonance frequency.

11. A motor according to claim 9, wherein a ratio of a capacitive component of said vibration state detection element portion and a capacitive component of said capacitance element is set to fall within a range from 0.05 to 0.5.

12. A motor according to claim 8, wherein said impedance element is a resistance element.

* * * * *

UNITED STATES PATENT AND TRADEMARK OFFICE
CERTIFICATE OF CORRECTION

PATENT NO. : 5,739,621
DATED : April 14, 1998
INVENTOR(S) : AKIO ATSUTA, ET AL.

It is certified that error appears in the above-identified patent and that said Letters Patent is hereby corrected as shown below:

On the title page, item [56]
<u>References Cited</u>

FOREIGN PATENT DOCUMENTS

"3289375" should read --3-289375--
    "7193291" should read --7-193291--.

<u>Column 9</u>

Line 9, "apply" should read --applying--.

Signed and Sealed this

Fifteenth Day of September, 1998

Attest:

BRUCE LEHMAN

*Attesting Officer*      *Commissioner of Patents and Trademarks*